United States Patent
Chang et al.

(10) Patent No.: US 8,284,217 B2
(45) Date of Patent: Oct. 9, 2012

(54) METHOD FOR GENERATING A DYNAMIC INDEX

(75) Inventors: Wen-Chieh Chang, Hsin-Chu (TW);
Yao-Jen Hsieh, Hsin-Chu (TW);
Huan-Hsin Li, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 1383 days.

(21) Appl. No.: 11/698,123

(22) Filed: Jan. 26, 2007

(65) Prior Publication Data
US 2007/0192389 A1    Aug. 16, 2007

(30) Foreign Application Priority Data

Jan. 27, 2006 (TW) ............................... 95103614 A
Feb. 14, 2006 (TW) ............................... 95104940 A (51) Int. Cl.
*G09G 5/10* (2006.01)
(52) U.S. Cl. ..................................... 345/690; 708/250
(58) Field of Classification Search .................. 345/418, 345/596, 599, 619, 644, 690, 694; 348/574; 358/3.13, 3.14, 3.19, 457; 708/250; 327/172; 341/131
See application file for complete search history.

(56) References Cited

U.S. PATENT DOCUMENTS

| | | | | |
|---|---|---|---|---|
| 5,706,105 A | * | 1/1998 | Naylor, Jr. | 358/3.23 |
| 5,712,657 A | * | 1/1998 | Eglit et al. | 345/690 |
| 5,831,586 A | * | 11/1998 | Hirai et al. | 345/94 |
| 6,294,936 B1 | | 9/2001 | Clementi | |
| 6,795,085 B1 | * | 9/2004 | Doherty et al. | 345/596 |
| 8,004,436 B2 | * | 8/2011 | Kapusta et al. | 341/131 |
| 2003/0174005 A1 | * | 9/2003 | Latham et al. | 327/172 |
| 2005/0110796 A1 | | 5/2005 | Flowers et al. | |

FOREIGN PATENT DOCUMENTS

TW           528983 B      4/2003

* cited by examiner

*Primary Examiner* — Quan-Zhen Wang
*Assistant Examiner* — Yuk Chow
(74) *Attorney, Agent, or Firm* — Birch, Stewart, Kolasch & Birch, LLP (57) ABSTRACT

Disclosure is a method for randomly and dynamically generating a dynamic index, incorporated in a dynamic index system to improve the color performance of a display, comprises: transmitting video data to the dynamic index system; dynamically generating a substantially random number by a pseudo-random number generating unit; selecting the m bits of the substantially random number as a target adapted to as a position code of the dynamic pattern index matrix; and generating the two-dimensional dynamic pattern index matrix (S×T) by operating the position code.

28 Claims, 6 Drawing Sheets

METHOD FOR GENERATING A DYNAMIC INDEX

FIELD OF THE INVENTION

The present invention relates to a dithering system, which is applied to the hue-extending technology of the digital image field and, more particularly, to adopt random dynamic pattern indexes to achieve the result of hue-extension.

BACKGROUND OF THE INVENTION

The liquid crystal display (LCD) has various features in power-saving, low irradiation, slim weight, thinner volume, etc. For example, its in laptop has being broadly used. Currently, the large-scale LCD has been widely applied to personal computers (PC) to replace the traditional cathode ray tubes (CRT). Nevertheless, the development of the LCD still meets a bottleneck in the dynamic image.

The bottleneck is mainly that the chromatic gradations cannot be truly displayed, such as general visible images; Further, the color reproducibility of the display image is in aliasing while in high resolution. Therefore, how to solve the problem is an important issue for people skilled in the art.

The technology of hue-extension is the solution to the problem of unsatisfied saturation of color. It is applied to the digital image display field, more particularly to the thin film transistor LCD (TFT-LCD). The technology applied to TFT-LCD uses the principles of dithering and frame-rate-control (FRC), which cooperates with the vision synthesis and physiology of human being and adopt the technology of mixing color in the space to achieve the effect of hue-extension of vision of the human being.

Figure 1A:
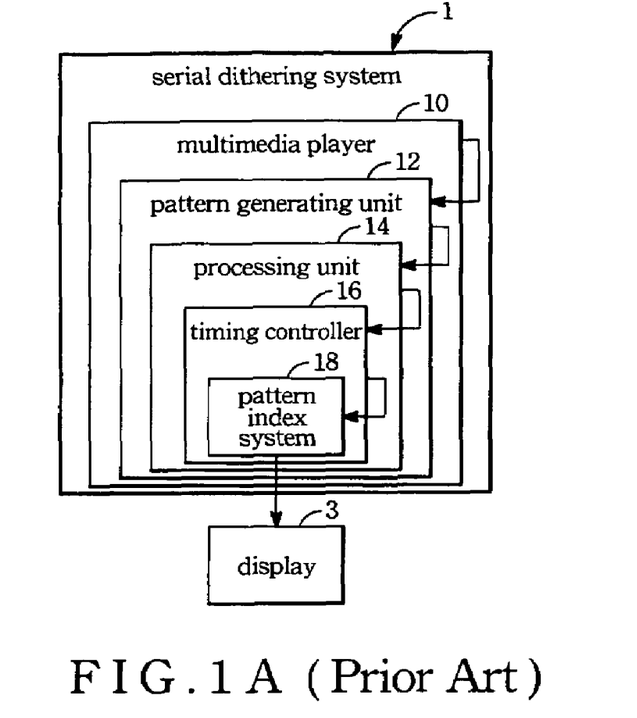
FIG. 1A is a schematic view of a convectional serial dithering system.

Referring to FIG. 1A, which is a schematic view of a typical serial dithering system. The serial dithering system 1 is composed of a multimedia player 10, which includes a pattern generating unit 12. The pattern generating unit 12 has a processing unit 14, which is a video card (also called a graphics card) or a processor with a timing controller (T-CON) 16. The timing controller 16 has a pattern index system 18. Generally speaking, the processing unit 14 of the pattern generating unit 12 pre-processes the video data by a way of fixed-pattern and outputs the pre-processed video data to the timing controller 16. The pattern index system 18 of the timing controller 16 continuously proceeds the follow up procedures of the hue-extension in the display device.

Figure 1B:
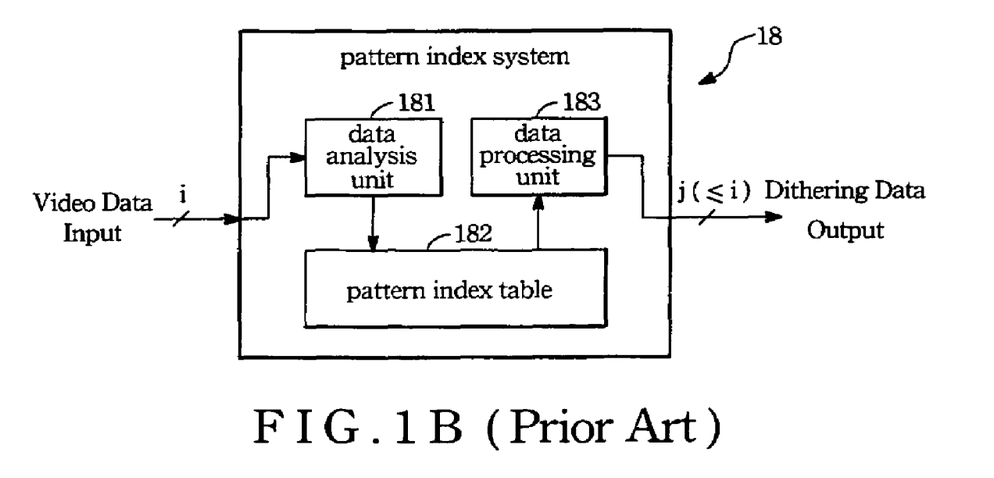
FIG. 1B is a schematic view of a convectional pattern index system.

Referring to FIG. 1B at the same time, which is a schematic view of a conventional pattern index system. The pattern index system 18 includes a data analysis unit 181, a pattern index table 182, and a data processing unit 183. The conventional dithering technology usually adopts a fixed pattern index table 182 (or said as a pattern table). The pattern index table 182 is directly inputted or burned into the timing controller 16 so as to be a basis for dithering images. The i bits of the video data pre-processed by way of the fixed-pattern are inputted into the data analysis unit 181. According to the video data look it up in the fixed pattern index table 182 and then the operation of the data processing unit 183 is made to output for the determination of the j bits of dithering data. Wherein j is smaller than or equal to i.

In the conventional technique described above, at least two disadvantages for using the fixed pattern index table can be seen. The first disadvantage is that the reference value of an optimized pattern index is difficulty found out, and the second disadvantage is that, while the front of the processing unit 14 simultaneously operates in the way of the fixed-pattern, the hue-extension of the downstream display device connected in series may then appear the unpredictable miscellaneous lines. Hence conspicuous stepped-type lines are caused during that the images are gradually changed. The conflict phenomenon of the serial dithering system is seriously influence the quality of the images.

SUMMARY OF THE INVENTION

In general, in one aspect, the present invention relates to provide a method for generating a dynamic pattern index matrix to improve the color performance of the display and to enhance the fixed-pattern efficiency.

In one embodiment of the present invention, a method for randomly and dynamically generating a dynamic index is incorporating a dynamic index system to improve the color performance of an electric-optical device. The dynamic index system receives video data and processes each sub-pixel datum of the video data by a pseudo-random number generating unit of the dynamic index system to alternately form respective three-dimension dithering data including a pixel, a line, and a frame. The method comprises: transmitting the video data to the dynamic index system; dynamically generating a substantially random number by the pseudo-random number generating unit; selecting m bits of the substantially random number as a target adapted to as a position code of a dynamic pattern index matrix; repeating the step of selecting m bits of the substantially random number as a target adapted to as a position code of a dynamic pattern index matrix for M times so as to guide the acquired N sets of m bits as the position code of the dynamic pattern index matrix; generating the two-dimensional dynamic pattern index matrix (S×T) according to the position code by operating of the pseudo-random number generating unit.

In another embodiment of the present invention, the method for randomly and dynamically generating a dynamic index comprises: transmitting the video data to the dynamic index system; dynamically generating a substantially random number by the pseudo-random number generating unit; selecting the m bits of the substantially random number as a target adapted to as a position code (1, 1) of a dynamic pattern index matrix; generating a vector position code of the dynamic pattern index matrix by the position code (1, 1); and generating a two-dimensional dynamic pattern index matrix (S×T) by operating the vector position code.

BRIEF DESCRIPTION OF THE DRAWINGS

The features, objects, and advantages of the present invention will become more apparent from the following detailed description of the preferred embodiment of this invention, with reference to the accompanying drawings, in which.

DETAILED DESCRIPTIONS OF THE PREFERRED EMBODIMENT

The present invention provides a method for randomly and dynamically generating a dynamic index. A plurality of new dynamic index tables is dynamically generated during the time intervals of changing pictures.

Figure 2A:
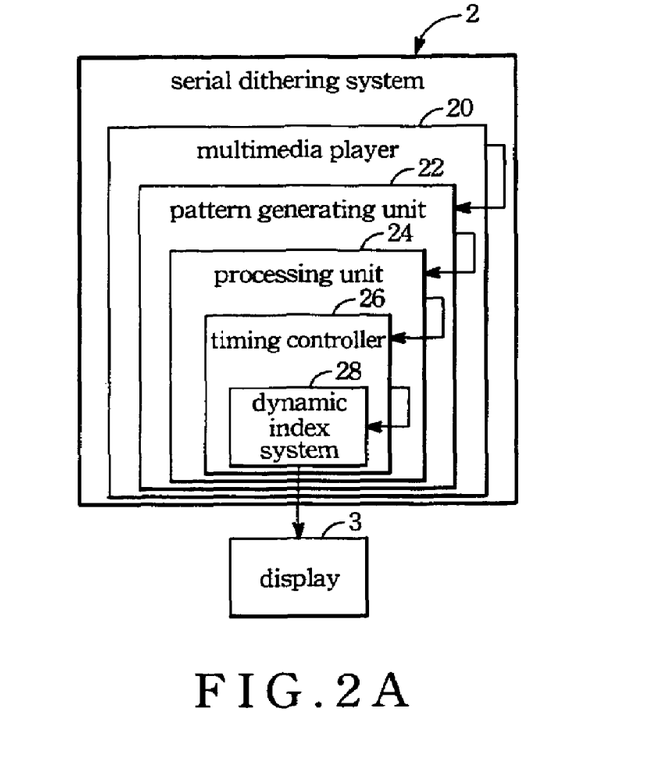
FIG. 2A illustrates a schematic view of an embodiment of a serial dithering system of the present invention.

Referring to FIG. 2A, a schematic view of an embodiment of a serial dithering system of the present invention is shown. The serial dithering system 2 includes a multimedia player 20. The multimedia player 20 includes a pattern generating unit 22. The pattern generating unit 22 includes a processing unit 24. The processing unit 24 includes a timing controller (T-CON) 26. The timing controller 26 includes a dynamic index system 28.

Figure 2B:
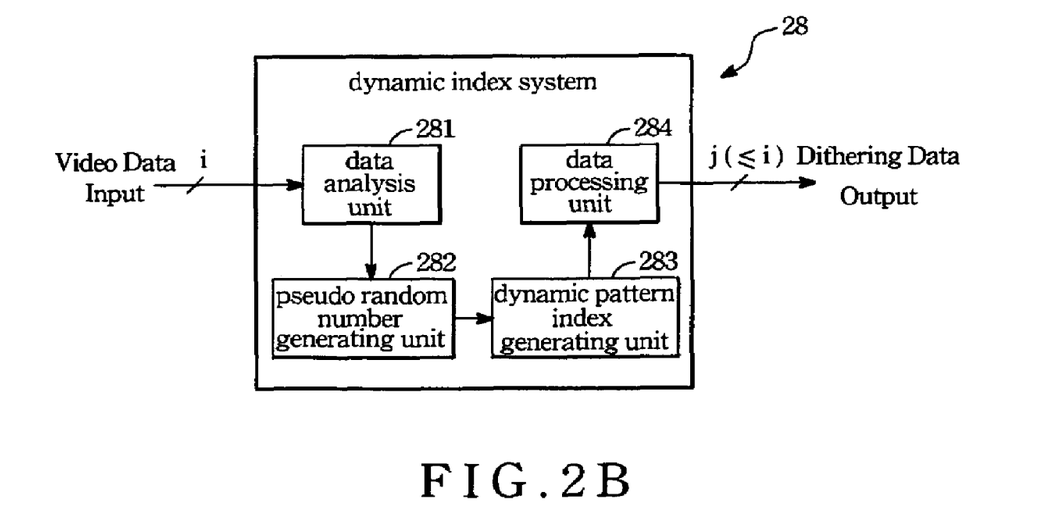
FIG. 2B illustrates a schematic view of an embodiment of a dynamic index system of the present invention.

Referring to FIG. 2B, a schematic view of an embodiment of the dynamic index system of the present invention is shown. The dynamic index system 28 includes a data analysis unit 281, a pseudo-random number generating unit 282, a dynamic pattern index generating unit 283, and a data processing unit 284. The data analysis unit 281 can receive i-bit video data from the timing controller 26. The sub-pixel video data are transmitted to the pseudo-random number generating unit 282. Each pixel has at least three sub-pixels comprise red (R) sub-pixel, green (G) sub-pixel, and blue (B) sub-pixel or yellow (Y) sub-pixel, cyan (C) sub-pixel, and magenta (M) sub-pixel so as to represent the color of each pixel, but not limited it. On the other hand, each pixel has at least four sub-pixels comprise are red (R) sub-pixel, green (G) sub-pixel, blue (B) sub-pixel, and a fourth sub-pixel. The color of the fourth sub-pixel can be any color, such as red (R), green (G), blue (B), yellow (Y), violet (V), indigo (I), magenta (M), cyan (C), colorless, or likes. Nevertheless, each pixel can also have at least six or eight sub-pixels, and the arrangement of each sub-pixel and colors of each sub-pixel can be determined by a user. The pseudo-random number generating unit 282 includes a plurality of linear feedback shift registers (LFSR) to generate substantially random numbers to be transmitted to the dynamic pattern index generating unit 283. The dynamic pattern index generating unit 283 uses the substantially random numbers to generate a dynamic pattern index matrix to be transmitted to the data processing unit 284. At then, the data processing unit 284 transmits plural j bits of dithering data, in which the i is substantially greater than or equal to the j.

In the present invention, the dynamic pattern index matrix derived by substantially random numbers is the basis of the dithering data. The dithering data can be a reference to update images of changing frames, while the dithering data are adapted to one frame, each frame, or a plurality of frames for dithering calculation. Due to the substantially random numbers of the dynamic pattern index matrix, the dithering effect of the dithering data may scattered the contour of one frame, each frame, and the frames. If the image is plus the substantially uniformly random numbers of the dynamic pattern index matrix, so as to the boundaries of digital images may be substantially softly. Constructing the image with three dimensions of pixel, line, and frame is based on the dithering data, therefore the digital colors shall be represented by fewer bits to show the digital colors shall be represented by greater bits so as to achieve a better quality of the image.

A plurality of embodiments describe the generation of the substantially random number and the derivation of the dynamic pattern index matrix from the substantially random number, and are listed below. But not limited it. If the substantially random number comprises other method for generating thereof can be incorporating the present invention.

Figure 3A:
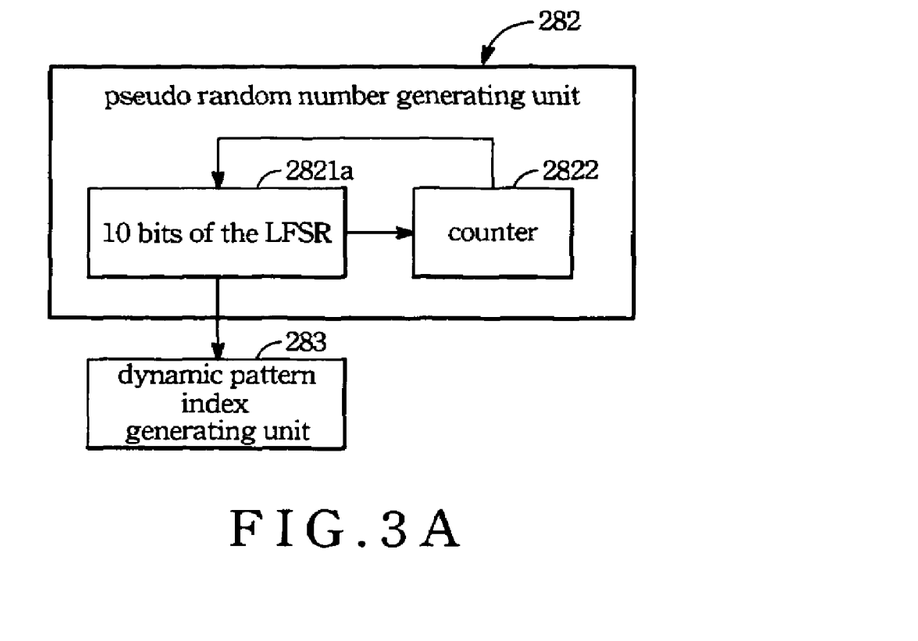
FIG. 3A illustrates a schematic view of a pseudo-random number generating unit and a dynamic pattern index generating unit of the present invention.
Figure 3B:
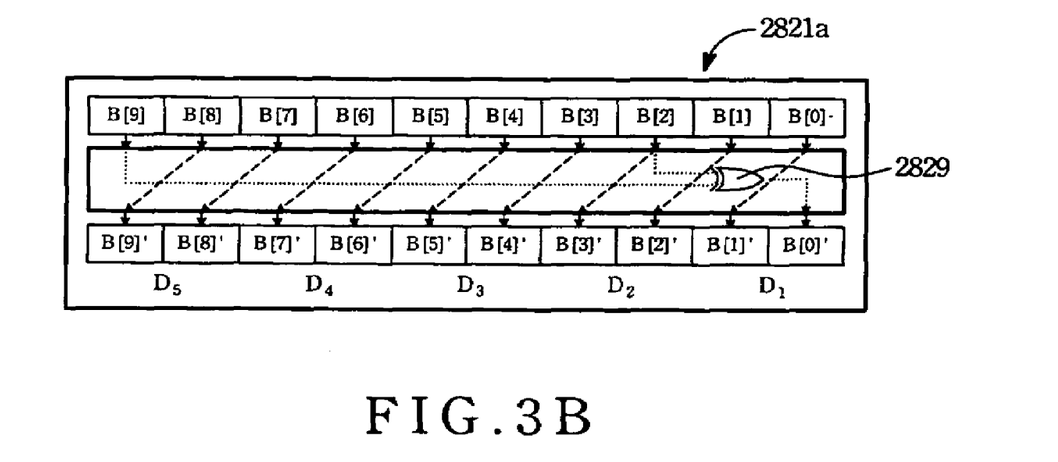
FIG. 3B illustrates a schematic view of a linear feedback shift register of the pseudo-random number generating unit of the present invention.

Referring to FIG. 3A and FIG. 3B, which illustrate respectively a schematic view of a pseudo-random number generating unit and a schematic view of a linear feedback shift register of the present invention. The pseudo-random number generating unit 282 includes at least one linear feedback shift register 2821a (thereafter, called LFSR 2821a) and a counter 2822 (such as liner counter or likes). In present embodiment, the pseudo-random number generating unit 282 will be described as a 10-bit LFSR 2821a.

In present embodiment of the invention, the LFSR 2821a receives the video data and engages in one of the way of the operation of XOR 2829 and the operation of mutual exclusion for the video data so as to generate a bit sequence with a great period. The steps of generating the substantially random number comprise: the LFSR 2821a receives the video data as an initial value of the LFSR 2821a to generate the substantially random numbers. Wherein if the video data is substantially zero, both outputted values of the substantially random number and the dithering data are zeros, if the video data is substantially non-zero, the video data is a digital signal with 10 bits of the initial value of the LFSR 2821a, and the 10-bit signal, from the lowest bit to the highest bit are the order of B[0], B[1], B[2], B[3], B[4], B[5], B[6], B[7], B[8], and B[9], one of the way of the operation of XOR and the operation of mutual exclusion of the B[2] and B[9] results as B[0]' is one of the substantially random numbers, thereafter the initial values of B[0], B[1], B[2], B[3], B[4], B[5], B[6], B[7], and B[] can be as B[1]', B[2]', B[3]', B[4]', B[5]', B[6]', B[7 ]', B[8]', and B[9]' of the substantially random numbers. Thus, a new substantially random number is generated. The generated substantially random number is decided whether to add 1 to the substantially random number or not by the counter 2822, and then the generated substantially random number is fed back to the LFSR 2821a. The LFSR 2821a transmits the generated substantially random number to the dynamic pattern index generating unit 283 to dither and allows the generated substantially random number be a new initial value of the LFSR 2821a.

With the description in above paragraph, the circulation is continuous to generate more and more new substantially random numbers. The derived substantially random number has the following features (for example: 10 bit).

(1) Each substantially random number is in the scope substantially smaller than or substantially equal to $2^{10}$, which means that the substantially random number is an integer between 1 and 1023 (including 1 and 1023).

(2) The period of the circulation is 1023, excluding the possibility of 0. It means that, in a period, any integer between 1 and 1023, including 1 and 1023, can only appear once.

(3) If the sequence of the substantially random number is longer, the appearing possibility of any integer approaches a value. For example, the value is 1/1023 for the above example.

The substantially random number of the present invention comprises a plurality of Dn sets of bits, n is 1 to N, and each of D1 to Dn includes m bits. For the present embodiment of the invention, the substantially random number comprises five sets which are D1, D2, D3, D4, and D5, and each set has 2 bits; for example, the D1 having B[1]' and B[0]', the D2 having B[3]' and B[2]', etc. The definiens as mentioned above is not to limit the scope of the present invention and is variable according to demands.

The dynamic pattern index generating unit of the present invention may define a set called Dx as a target (a), or define a set called Dy as an guide to indicate an acquired Dx to be the target, wherein x and y are 1 to N. For example, the dynamic pattern index generating unit may take D1 from the substantially random number as a target (a) and so as to allow the target be a position code (PosCode) of follow-up generating a dynamic pattern index, or take D1 from the substantially random number as the guide to the acquired target to a certain set. For example, when D1 is taken as a guide, two bits of D1 would be used to indicate the acquired target. In the case that the two bits of D1 are 00, the two bits are guided to D2 as a target (a). In the case that the two bits of D1 are 01, the two bits are guided to D3 as the target (a). Similarly, D4 would be the target (a) while the two bits of D1 are 10, and D5 would be the target (a) while the two bits of D1 are 11. By repeating the above-mentioned indicating procedure and /or a non-duplication of the substantially random number to generate other position codes (such as (b), (c), etc) can then be updated. Hence, a column vector position code (S×1) can be generated and further used to generate the dynamic pattern index matrix (S×T). Alternatively, in accordance with the same procedures described above, a row vector position code (1×T) can be generated to indicate another dynamic pattern index matrix (S×T). Also, when the target (a) is defined in a row form, then, by repeating the procedures, a plurality of row vectors can be generated so as to form the dynamic pattern index matrix (S×T).

Figure 4A:
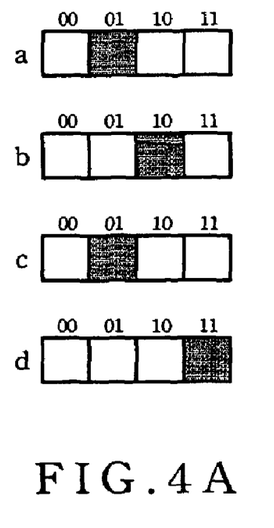
FIG. 4A is a schematic view of a first embodiment of S×1 position code of the present invention.
Figure 4B:
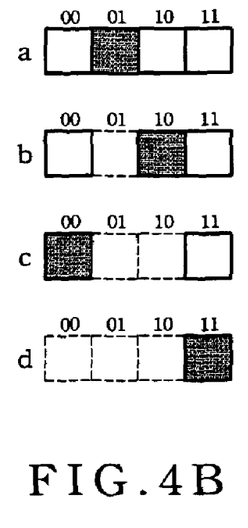
FIG. 4B is a schematic view of a second embodiment of S×1 position code of the present invention.

Referring to FIG.4A and FIG.4B, which show schematic views of two embodiments of the position code in the present invention. The column position code (S×1) plus a predetermined number (such as Nn*3, or the like) is the nth column of the dynamic pattern index matrix (S×T), n is 1 to N. For example, In FIG.4A, the position code comprises the column vector position code, the two bits of the targets (a), (b), (c), and (d) are shown as 01, 10, 01, and 11, respectively. It is noted that the appearing possibility of the targets (a) and (c) have the same two digits. But not limited it, can be applied to the position code comprises the row vector position code.

In FIG. 4B, an arithmetic rule is added to process the vector position code so as to avoid the same bits of the position code to be acquired. The dynamic index system acquires the target (a) from the substantially random number, and acquires the target (b) from another substantially random number. In acquiring the target (b), the target (a) is excluded from the selection. Or, perfectly, the substantially random number can be via the operating to generate another substantially random number. In acquiring the target (c), the targets (a) and (b) are excluded. According to the same acquiring logics, the target (d) can be determined to be 11 as shown.

In present embodiment of the invention shown in FIG. 4B, when the target (a) is determined to be 01, the target (b) can then be acquired a value from the group of 00, 10 and 11. As the 10 is acquired to represent the target (b), the target (c) can only be selected other value from the rests 00 and 11. As soon as the target (c) is determined to be 00, the only choice for the target (d) is only the two-bit 11. From the group of 00, 01, 10 and 11 as shown in FIG. 4B, the number of all possible combinations to form the targets (a), (b), (c), and (d) is 24. All these 24 permutations are formed with orthogonal; i.e. no two permutations in the midst can be the same.

Figure 4C:
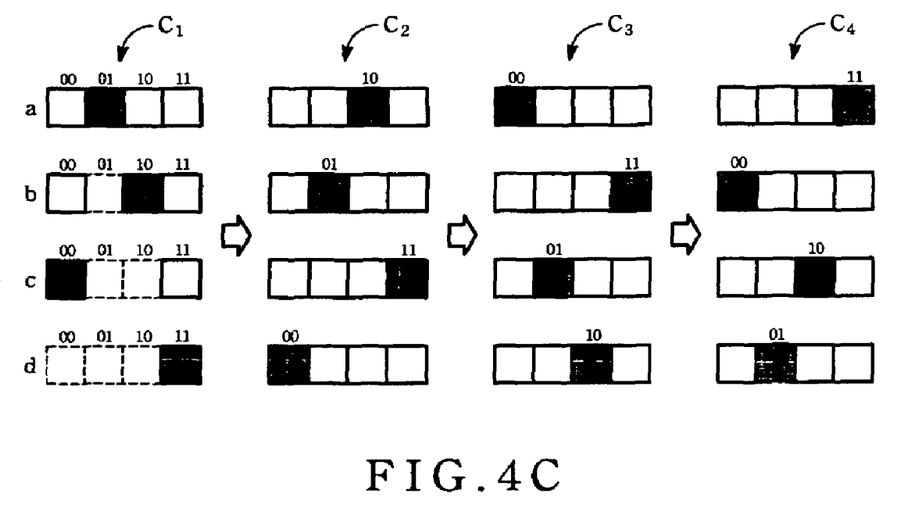
FIG. 4C shows a flow to generate a dynamic pattern index matrix by the position code of the present invention.

In the embodiment of the present invention, the column vector position code (S×1) of the dynamic pattern index matrix can be the first column of the dynamic pattern index matrix (S×T), the second column can be one complement of first column (such as an anti-phase of the first column, or likes), the third column can be formed by adding a predetermined value (say, $K_3$) to the second column, the fourth column can be the one complement of first column (such as an anti-phase of the third column, or likes), the fifth column can be formed by adding a predetermined value (say, $K_5$) to the fourth column, . . . , the (2n)th column can be the one complement of the (2n−1)th column (such as an anti-phase of the (2n−1)th column, or likes), and the (2n+1)th column can be formed by adding a predetermined value (say, $K_{2n+1}$) to the (2n)th column, in which n is 1 to N. For exemplary, as shown in FIG.4C, the above-mentioned algorithm is demonstrated by a (4×4) dynamic pattern index matrix. The (4×4) dynamic pattern index matrix has the targets of (a) equal to 01, (b) equal to 10, (c) equal to 00, and (d) equal to 11, and the predetermined value $K_3$ is equal to [10]. The column position code composed of a, b, c, and d is defined as the first column $C_1$ (01, 10, 00, 11), the second column $C_2$ (10, 01, 11, 00) is the one complement of first column $C_1$ (such as an anti-phase of the first column, or likes), the second column $C_2$ plus $K_3$ [10] is the third column $C_3$ (00, 11, 01, 10), and the fourth column $C_4$ (11, 00, 10, 01; ) is the one complement of third column $C_3$ (such as an anti-phase of the third column, or likes). But not limited, it can be applied to the position code comprises the row vector position code.

Figure 5A:
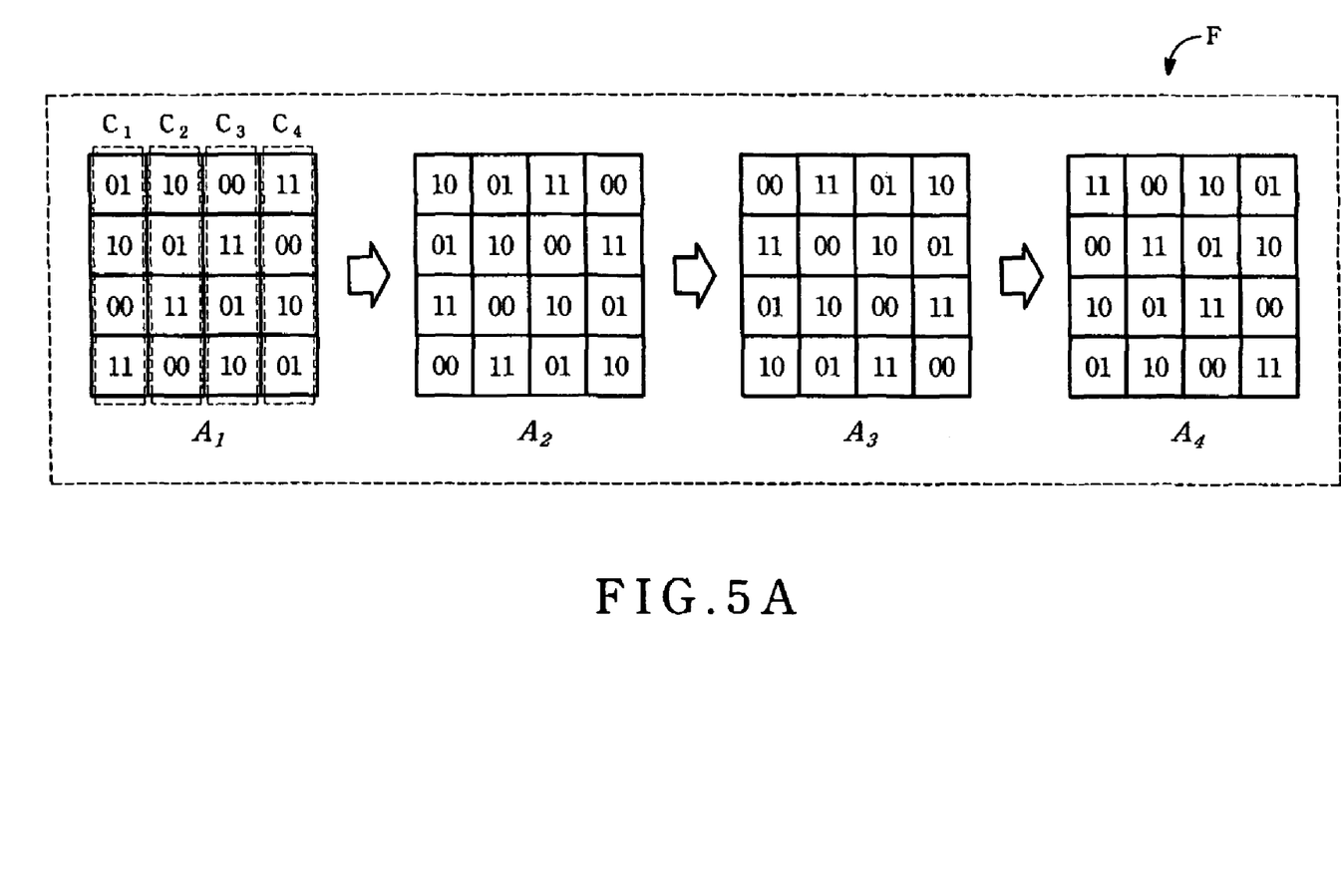
FIG. 5A shows a flow to generate a plurality of dynamic pattern index matrixes by one dynamic pattern index matrix of the present invention.
Figure 5B:
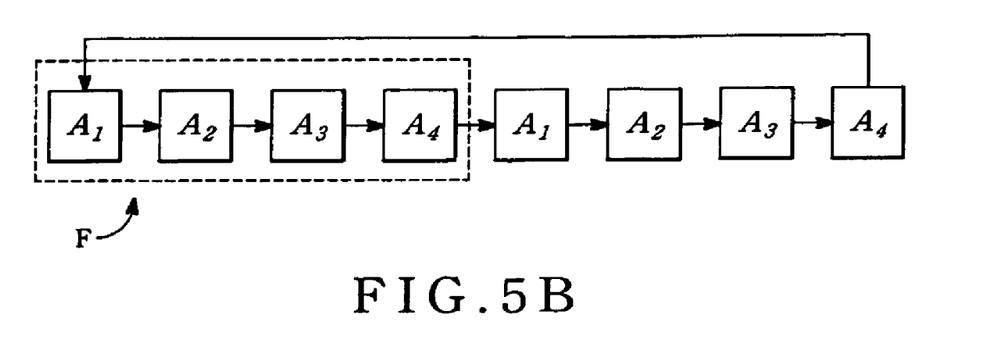
FIG. 5B illustrates a schematic view of a first embodiment of operating a fractal dynamic pattern index matrix of the present invention.
Figure 5C:
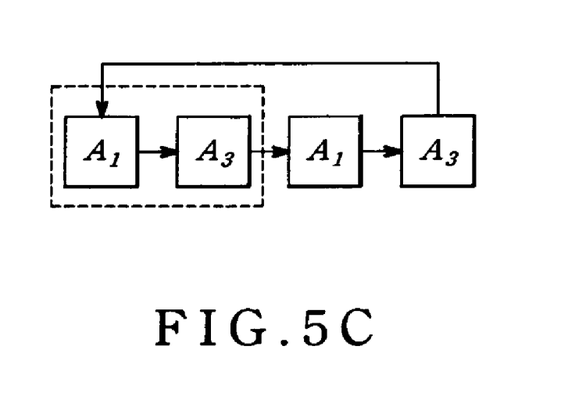
FIG. 5C illustrates a schematic view of a second embodiment of operating a fractal dynamic pattern index matrix of the present invention.
Figure 5D:
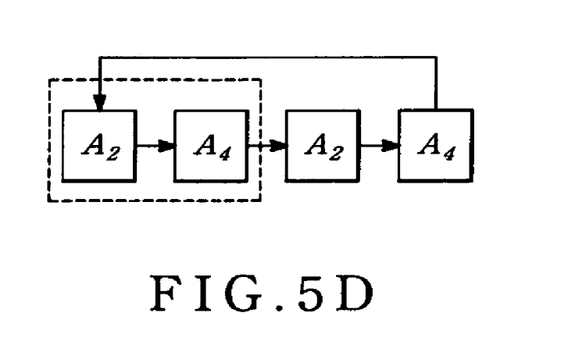
FIG. 5D illustrates a schematic view of a third embodiment of operating a fractal dynamic pattern index matrix of the present invention.

Referring to FIGS. 5A-5D, which illustrate a further embodiment of the dynamic pattern index matrix of the present invention formed by the fractal arithmetic. The fractal arithmetic is a concept of self clone. In FIG. 5A, the dynamic pattern index matrix $A_1$ is formed with four frames ($C_1$, $C_2$, $C_3$, and $C_4$) generated in FIG. 4C. The second dynamic pattern index matrix $A_2$ is the complement (such an anti-phase or likes) matrix of the dynamic pattern index matrix $A_1$, the third dynamic pattern index matrix $A_3$ is formed by adding a predetermined value of 10 to every entry of the second dynamic pattern index matrix $A_2$, and the fourth dynamic pattern index matrix $A_4$ is the complement (such an anti-phase or likes) matrix of the third dynamic pattern index matrix $A_3$. By transmitting the self-cloning algorithm as described above, any multiple-frame dynamic pattern index matrix can be easily obtained. For example, in FIG. 5B, a 32-frame dynamic index system can be formed by amplifying the four matrixes ($A_1$, $A_2$, $A_3$, and $A_4$) of FIG. 5A. In FIG. 5C, the dynamic pattern index matrixes $A_1$ and $A_3$ clone themselves to amplify a matrix as shown. On the other hand, in FIG. 5D, the dynamic pattern index matrix $A_2$ and $A_4$ are used to self-clone.

With the above-mentioned embodiments, the present invention uses the dynamic index system to enhance the effect of hue-extension. That is, the digital colors represented by the same bits can then provide the image a better display quality. The cascade of the fixed-pattern and the pre-processed fixed-pattern in the electric-optical device (such liquid crystal panel, emitting-itself panel, or likes) is thus totally and effectively resolved.

Although the present invention and its advantages have been described in detail, as well as some variations over the disclosed embodiments, it should be understood that various other switches, substitutions and alterations can be made herein without departing from the spirit and scope of the invention as defined by the appended claims.

What is claimed is:

1. A method for randomly and dynamically generating a dynamic pattern index incorporated in a dynamic index system received video data and processed each sub-pixel datum of the video data by a pseudo-random number generating unit of the dynamic index system to alternately form dithering data of three dimensions of pixel, line, and frame, comprising:

transmitting the video data to the dynamic index system;
dynamically generating a substantially random number by the pseudo-random number generating unit;
selecting m bits of the substantially random number as at least one target adapted to as a position code of a dynamic pattern index matrix;
repeating the step of selecting the m bits of the substantially random number as at least one target adapted to as a position code of a dynamic pattern index matrix for M times so as to guide the acquired N sets of m bits as the position code of the dynamic pattern index matrix; and
generating the two-dimensional dynamic pattern index matrix (S×T) according to the position code by operating of the pseudo-random number generating unit, wherein the pseudo-random number generating unit comprises a plurality of linear feedback shift registers, and the linear feedback shift registers receive the video data as an initial value of the linear feedback shift registers and the linear feedback shift registers produce the substantially random number by a way of the operation of XOR with the initial value.

2. The method according to claim 1, wherein the pseudo-random number generating unit processes each the sub-pixel datum of the video data to generate the substantially random number.

3. The method according to claim 1, wherein the substantially random number comprises N sets, each of the N sets has m bits, and one of the N sets is as the target.

4. The method according to claim 1, wherein the substantially random number comprises N sets, each of the N sets has m bits, and one of the N sets is as a guide to indicate an acquired set of the N sets as the target.

5. The method according to claim 1, wherein the position code of the dynamic pattern index matrix comprises a column vector position code (S×1) of the dynamic pattern index matrix.

6. The method according to claim 5, wherein the column vector position code (S×Nn), the value Nn is predetermined number that represents the n-th column as a target adapted position code within the dynamic pattern index matrix (S×T), wherein the repeated step further includes wherein Nn=1~Nn+1.

7. The method according to claim 5, wherein the column vector position code (S×Nn), the value Nn is predetermined number that represents the n-th column as a target adapted position code within the dynamic pattern index matrix (S×T), wherein the column vector position code (S×1) is a first column of the dynamic pattern index matrix (S×T), the second column (S×2) of the dynamic pattern index matrix (S×T) is a one's complement of the first column (S×1), and the third column (S×3) of the dynamic pattern index matrix (S×T) is the second column (S×(1+Kn)), wherein Kn is a positive integer, and the repeating step includes Kn being equal to the values n=1~(S−1), S>2.

8. The method according to claim 5, wherein the column vector position code (S×Nn), the value Nn is predetermined number that represents the n-th column as a target adapted position code within the dynamic pattern index matrix (S×T), wherein the column vector position code (S×(1+Kn)) is a first column of the dynamic pattern index matrix (S×T), the second column (S×2) of the dynamic pattern index matrix (S×T) is a one's complement of the first column (S×(1+Kn)), and the third column (S×3) of the dynamic pattern index matrix (S×T) is the second column (S×(2+Kn)), wherein Kn is a positive integer, and the repeating step includes Kn being equal to the values n=1~S.

9. The method according to claim 1, wherein the position code of the dynamic pattern index matrix comprises a row vector position code (1×T) of the dynamic pattern index matrix.

10. The method according to claim 9, wherein the row vector position code (Nn×T), the value Nn is predetermined number that represents the n-th row as a target adapted position code within the dynamic pattern index matrix (S×T), wherein the repeated step further includes wherein Nn=1~Nn+1.

11. The method according to claim 9, wherein the row vector position code (T×Nn), the value Nn is predetermined number that represents the n-th row as a target adapted position code within the dynamic pattern index matrix (S×T), wherein the row vector position code (1×T) is a first row of the dynamic pattern index matrix (S×T), the second row (2×T) of the dynamic pattern index matrix (S×T) is a one's complement of the first row (1×T), and the third row (3×T) of the dynamic pattern index matrix (S×T) is the second row ((1+Kn)×T), wherein Kn is a positive integer, and the repeating step includes Kn being equal to the values n=1~(S−1), S>2.

12. The method according to claim 9, wherein the row vector position code (T×Nn), the value Nn is predetermined number that represents the n-th row as a target adapted position code within the dynamic pattern index matrix (S×T), wherein the row vector position code ((1+Kn)×T) is a first row of the dynamic pattern index matrix (S×T), the second row (2×T) of the dynamic pattern index matrix (S×T) is a one's complement of the first row ((1+Kn)×T), and the third row (3×T) of the dynamic pattern index matrix (S×T) is the second row ((2+Kn)×T), wherein Kn is a positive integer, and the repeating step includes Kn being equal to the values n=1~S.

13. The method according to claim 1, wherein the column number S of the dynamic pattern index matrix (S×T) is equal to the row number T of the dynamic pattern index matrix (S×T).

14. A method for randomly and dynamically generating a dynamic pattern index incorporated in a dynamic index system received video data and processed each sub-pixel datum of the video data by a pseudo-random number generating unit of the dynamic index system to alternately form dithering data of three dimensions of pixel, line, and frame, comprising:

transmitting the video data to the dynamic index system;
dynamically generating a substantially random number by the pseudo-random number generating unit;
selecting m bits of the substantially random number as a target adapted to as a position code (1,1) of a dynamic pattern index matrix;
generating a vector position code of the dynamic pattern index matrix by the position code (1,1); and
generating the two-dimensional dynamic pattern index matrix (S×T) by operating the vector position code, wherein the pseudo-random number generating unit comprises a plurality of linear feedback shift registers, and the linear feedback shift registers receive the video data as an initial value of the linear feedback shift registers and the linear feedback shift registers produce the substantially random number by a way of the operation of XOR with the initial value.

15. The method according to claim 14, wherein the pseudo-random number generating unit processes each the sub-pixel datum of the video data to generate the substantially random number.

16. The method according to claim 14, wherein the substantially random number comprises N sets, each of the N sets has m bits, and one of the N sets is as the target.

17. The method according to claim 14, wherein the substantially random number comprises N sets, each of the N sets has m bits, and one of the N sets is as a guide to indicate an acquired set of the N sets as the target.

18. The method according to claim 14, wherein the column vector position code (S×Nn), the value Nn is predetermined number that represents the n-th column as a target adapted position code position code (1,1), wherein the column vector position code (S×1) is a first column of the position code (1,1), the second column (S×2) of the dynamic pattern index matrix (S×T) is a one's complement of the first column (S×1), and the third column (S×3) of the dynamic pattern index matrix (S×T) is the second column (S×(1+Kn)), wherein Kn is a positive integer, and the repeating step includes Kn being equal to the values n=1~(S−1), S>2.

19. The method according to claim 18, wherein the column vector position code (S×Nn), the value Nn is predetermined number that represents the n-th column as a target adapted position code within the dynamic pattern index matrix (S×T), wherein the repeated step further includes wherein Nn=1~Nn+1.

20. The method according to claim 19 wherein the column vector position code (S×Nn), the value Nn is predetermined number that represents the n-th column as a target adapted position code within the dynamic pattern index matrix (S×T), wherein the column vector position code (S×1) is a first column of the dynamic pattern index matrix (S×T), the second column (S×2) of the dynamic pattern index matrix (S×T) is a one's complement of the first column (S×1), and the third column (S×3) of the dynamic pattern index matrix (S×T) is the second column (S×(1+Kn)), wherein Kn is a positive integer, and the repeating step includes Kn being equal to the values n=1~(S−1), S>2.

21. The method according to claim 19, wherein the column vector position code (S×Nn), the value Nn is predetermined number that represents the n-th column as a target adapted position code within the dynamic pattern index matrix (S×T), wherein the column vector position code (S×(1+Kn)) is a first column of the dynamic pattern index matrix (S×T), the second column (S×2) of the dynamic pattern index matrix (S×T) is a one's complement of the first column (S×(1+Kn)), and the third column (S×3) of the dynamic pattern index matrix (S×T) is the second column (S×(2+Kn)), wherein Kn is a positive integer, and the repeating step includes Kn being equal to the values n=1~S.

22. The method according to claim 14, wherein the row vector position code (T×Nn), the value Nn is predetermined number that represents the n-th row as a target adapted position code (1,1), wherein the row vector position code (1×T) is a first row of the dynamic pattern index matrix (S×T) the second of the position code (1,1) is a one's complement of the first row (1×T), and the third row (3×T) of the dynamic pattern index matrix (S×T) is the second row ((1+Kn)×T), wherein Kn is a positive integer, and the repeating step includes Kn being equal to the values n=1~(S−1), S>2.

23. The method according to claim 22, wherein the row vector position code (Nn×T), the value Nn is predetermined number that represents the n-th row as a target adapted position code within the dynamic pattern index matrix (S×T), wherein the repeated step further includes wherein Nn=1~Nn+1.

24. The method according to claim 22, wherein the row vector position code (T×Nn), the value Nn is predetermined number that represents the n-th row as a target adapted position code within the dynamic pattern index matrix (S×T), wherein the row vector position code (1×T) is a first row of the dynamic pattern index matrix (S×T), the second row (2×T) of the dynamic pattern index matrix (S×T) is a one's complement of the first row (1×T), and the third row (3×T) of the dynamic pattern index matrix (S×T) is the second row ((1+Kn)×T), wherein Kn is a positive integer, and the repeating step includes Kn being equal to the values n=1~(S−1), S>2.

25. The method according to claim 22, wherein the row vector position code (T×Nn), the value Nn is predetermined number that represents the n-th row as a target adapted position code within the dynamic pattern index matrix (S×T), wherein the row vector position code ((1+Kn)×T) is a first row of the dynamic pattern index matrix (S×T), the second row (2×T) of the dynamic pattern index matrix (S×T) is a one's complement of the first row ((1+Kn)×T), and the third row (3×T) of the dynamic pattern index matrix (S×T) is the second row ((2+Kn)×T), wherein Kn is a positive integer, and the repeating step includes Kn being equal to the values n=1~S.

26. The method according to claim 14, wherein the vector position code comprises an orthogonal permuting, so that none of two the targets are identical.

27. A method for randomly and dynamically generating a dynamic pattern index incorporated in a dynamic index system received video data and processed each sub-pixel datum of the video data by a pseudo-random number generating unit of the dynamic index system to alternately form dithering data of three dimensions of pixel, line, and frame, comprising:
  transmitting the video data to the dynamic index system;
  dynamically generating a substantially random number by the pseudo-random number generating unit;
  selecting m bits of the substantially random number as at least one target adapted to as a position code of a dynamic pattern index matrix, wherein the order of the lowest bit to the highest bit of the m bits of the random number are $B_x$, x=1~m, wherein a $B_1$ is as a first number bit, a $B_2$ is as a second number bit, a $B_3$ is as a third number bit, a $B_{10}$ is as a tenth number bit, a $B_{m-1}$ is as a second to the last number bit and a $B_m$ is as a last number bit;
  repeating the step of selecting the m bits of the substantially random number as at least one target adapted to as a position code of a dynamic pattern index matrix for M times so as to guide the acquired N sets of m bits as the position code of the dynamic pattern index matrix; and
  generating the two-dimensional dynamic pattern index matrix (S×T) according to the position code by operating of the pseudo-random number generating unit, wherein the pseudo-random number generating unit comprises a plurality of linear feedback shift registers, and the steps of producing the substantially random number including receiving the video data as an initial value; producing a new first number bit of the substantially random number by XOR the third number bit of the initial value and the tenth number bit of the initial value in a way of performing the operation of XOR; setting the first number bit to be a new second number bit, the second number bit to be a new third number bit, and the second-last number bit to be a new last number bit so the substantially random numbers is generated; and a next substantially random numbers is generated repeatedly by repeating the steps of producing a next first number bit by XOR the third number bit of a former substantially random numbers and the tenth number bit of a former substantially random numbers; and setting the former first number bit to be a next second number bit, a former second number bit to be a next third number bit, and a former second to the last number bit to be a next last number bit.

28. A method for randomly and dynamically generating a dynamic pattern index incorporated in a dynamic index system received video data and processed each sub-pixel datum of the video data by a pseudo-random number generating unit of the dynamic index system to alternately form dithering data of three dimensions of pixel, line, and frame, comprising:

transmitting the video data to the dynamic index system;

dynamically generating a substantially random number by the pseudo-random number generating unit;

selecting m bits of the substantially random number as a target adapted to as a position code (1,1) of a dynamic pattern index matrix, wherein the order of the lowest bit to the highest bit of the m bits of the random number are $B_x$, x=1~m, wherein a $B_1$ is as a first number bit, a $B_2$ is as a second number bit, a $B_3$ is as a third number bit, a $B_{10}$ is as a tenth number bit, a $B_{m-1}$ is as a second to the last number bit and a $B_m$ is as a last number bit;

generating a vector position code of the dynamic pattern index matrix by the position code (1,1); and generating the two-dimensional dynamic pattern index matrix (S×T) by operating the vector position code, wherein the pseudo-random number generating unit comprises a plurality of linear feedback shift registers, and the steps of producing the substantially random number including receiving the video data as an initial value; producing a new first number bit of the substantially random number by XOR the third number bit of the initial value and the tenth number bit of the initial value in a way of performing the operation of XOR; setting the first number bit to be a new second number bit, the second number bit to be a new third number bit, and the second to the last number bit to be a new last number bit so the substantially random numbers is generated; and a next substantially random numbers is generated repeatedly by repeating the steps of producing a next first number bit by XOR the third number bit of a former substantially random numbers and the tenth number bit of a former substantially random numbers; and setting the former first number bit to be a next second number bit, a former second number bit to be a next third number bit, and a former second to the last number bit to be a next last number bit.

* * * * *